United States Patent [19]

Slocum

[11] Patent Number: 5,743,326

[45] Date of Patent: Apr. 28, 1998

[54] METHOD OF AND APPARATUS FOR DAMPING BENDING VIBRATIONS WHILE ACHIEVING TEMPERATURE CONTROL IN BEAMS AND RELATED

[75] Inventor: Alexander H. Slocum, Concord, N.H.

[73] Assignee: AESOP, Inc., Concord, N.H.

[21] Appl. No.: 318,148

[22] Filed: Oct. 5, 1994

[51] Int. Cl.$^6$ .............................. B23Q 1/01; B23Q 15/18
[52] U.S. Cl. ............................................. 165/47; 248/636
[58] Field of Search ......................... 52/309.1; 248/636, 248/637; 165/47

[56] References Cited

U.S. PATENT DOCUMENTS

| | | | |
|---|---|---|---|
| 4,191,243 | 3/1980 | Donzis | 165/45 |
| 4,954,375 | 9/1990 | Sattinger et al. | 428/34.1 |
| 5,108,802 | 4/1992 | Sattinger | 428/34.1 |

FOREIGN PATENT DOCUMENTS

| | | | |
|---|---|---|---|
| WO92/01533 | 2/1992 | WIPO | 165/47 |

*Primary Examiner*—Allen J. Flanigan
*Attorney, Agent, or Firm*—Rines and Rines

[57] ABSTRACT

A system for achieving a high degree of damping in beams and structures made from beam-type elements such as machine tools and automation equipment, although the invention can apply to any type of structure which requires damping and/or temperature control. The invention is also concerned with utilization of the same structure to obtain a high degree of temperature control in some cases. A high degree of damping is obtained by making the beam hollow and inserting one or more structural members inside the beam along its approximate length, and then filling the annulus between the axial internal members and the external surrounding structure with a viscoelastic energy absorbing material such that the inner structures and the outer structure are fully linked in shear by the viscoelastic material so that any bending in the beams results in relative shear displacement between the beams which shears the viscoelastic material and thereby dissipates vibration energy. To be effective, the internal structural members must be carefully sized so that their cross sectional area is a substantial portion of the cross sectional area of the outer surrounding structure, and the internal structural members' neutral axes should be located as far as possible away from the surrounding structure's neutral axis. Furthermore, when the internal members are configured as tubes, temperature-controlled fluid (e.g., water) can be circulated through the tubes and used to control the temperature of the structure.

13 Claims, 3 Drawing Sheets

METHOD OF AND APPARATUS FOR DAMPING BENDING VIBRATIONS WHILE ACHIEVING TEMPERATURE CONTROL IN BEAMS AND RELATED

The present invention relates to a system for achieving a high degree of damping in beams and in structures made from beam-type elements, such as machine tools and automation equipment, although the invention can apply to any type of structure which requires damping control. The invention is further concerned with utilization of such damped structures to obtain a high degree of temperature control.

BACKGROUND

There are countless patents and designs for vibration absorption mechanisms, where there is an outer member and an inner member fixed to it via a lossy material such as rubber. An example is U.S. Pat. No. 4,865,299 which also displaces a fluid as a means of damping radial motions. These types of dampers, however, are designed to damp vibrations of the inner member with respect to the outer member in a radial direction. An example is an engine mount for a car. The fundamental issue is that the lossy material is compressed by the same amount as the vibration motion, and it is not configured to dissipate bending vibrations.

For beam bending applications, however, such radial motion dampers cannot be used because beams cannot be supported by a means that allows the magnitude of the vibration to cause a displacement of equal magnitude in a lossy material, the function of the beam itself being to suspend a load in space, which prevents the attachment of a compression type damper. Thus the damping must be obtained by means that utilize strains within the beam. These strains along and within the beam are, by their very nature, minuscule compared to the mount of deflection transverse to the beam. Thus a fundamentally different type of damping mechanism is required for beams, and the design rules are therefore radically and fundamentally different. In fact, the only type of motions within the beam that can be utilized to dissipate energy are shear strains, as compared to compressive or tensile forces in a vibration absorber, such as an engine mount.

There are also countless designs that are used to try to damp vibration in a beam, including filling the beam with concrete, epoxies, and other types of supposed damping media. An example is U.S. Pat. No. 4,512,616 where a hollow beam is filled with a damping material comprised of various polymers and aggregates. This is actually a decades-old method commonly used by a plethora of machine builders. The fundamental issue, however, is that such damping means do not couple shear motions along the length of the beam, so the shear motions act individually, and not cumulatively. They fundamentally cannot act cumulatively, because if they did, that would imply that the damping media have a high shear stiffness which would forfeit its shearing ability to create damping. The invention later described herein, on the other hand, as later explained, provides one or more rigid structural elements inside the beam to be damped, and the rigid structural element(s) acts as a backbone to accumulate and integrate the effect of the individual shear contributions of a damping material placed between the structural element and the structure to be damped.

There are many other patents that show a structure with inner and outer walls and concrete, grout, or glue between the walls. Examples include U.S. Pat. Nos. 4,939,878, 3,727,936, and 2,922,200. However, as will be later shown, in the present invention, its analysis equations and the real data obtained therewith, the damper will not work unless care is taken crucially to select the size and position of the damping structural elements, as well as the damping material. U.S. Pat. Nos. 997,493 and 2,126,622 show various elements coated with tar in the center of a concrete structure. These designs, however, are not intended, do not provide, and were not patented for the purpose of damping. They will not provide good damping for two reasons: First, the neutral axes of the elements are not properly offset from the structure (the elements cannot be centered). Secondly, tar, simple tape (e.g., duct tape), and the like will not provide anywhere near the damping obtainable by a specially formulated viscoelastomer covering, properly sized and spaced about a properly sized internal structural member, as later more fully discussed.

Using outer hollow beam-type elements with at least one internal cavity into which are inserted inner exactly aligned structural members, the neutral axes of which are offset from the neutral axis of the structure, and the internal structures typically having a hollow cross section and being externally coupled to the outer structure via a viscoelastic layer, when the outer structure vibrates, it shears with respect to the inner structure and dissipates energy by shearing the viscoelastic coupling layer.

This differs substantially from earlier designs that attempted to fill structures with damping (lossy) materials such as loaded epoxy materials before discussed. The fundamental difference is that in the novel method described herein, axial members with significant axial stiffness run the length of the structure, and are coupled to the structure by the lossy material from the inside, where no great deal of precision is required of the inner or outer structural members because errors in shape and surface finish are accommodated by the lossy material that hardens in place and acts to couple (in shear) the members together. Thus the internal members cumulatively shear the lossy material along their entire length, such that the first discrete viscoelastic element sees a shear motion of dx, and the Nth viscoelastic element sees a shear of Ndx. In the conventional manner, where a tube is merely filled with a damping agent, there is nothing to integrate the Shearing effect along the beam length, and each discrete element only sees a shearing motion of dx.

In the machine tool industry, in order to obtain high precision and increase tool life, a structure must be well damped; and in conditions requiting accuracy, the beam must often be temperature-controlled. Many structures are beam-like in nature, and must also be lightweight so as to maintain a high natural frequency to allow for greater speed and economy. Filling beams with damping materials such as sand, lead shot, concrete, or other such damping media is often an acceptably effective means of achieving damping that has been known for a long time; however, this increases the weight and provides a thermal mass that leads to temperature gradients and thermal distortion.

OBJECTS OF INVENTION

An object of the present invention, accordingly, is to provide a new and improved method of and apparatus for damping bending vibrations in beam structures and the like, particularly in, structures of the type described in a later-identified pending application, Ser. No. 942,262, wherein an outer beam-type structure is provided with one or more axial cavities into which axial damping members can be inserted and which have significant axial stiffness compared to the outer structure, with the internal axial damping members viscoelastically coupled to the outer structure.

A further object of the invention is to provide such a novel structure with minimized weight and maximized stiffness of the system.

Still a further object is to provide in such a novel structure for temperature-controlled fluid to be circulated throughout the internal damping members to provide precision temperature-control for preventing thermal distortions.

SUMMARY

In summary, the invention embraces a structure having a member or members comprised of outer beam-type structured elements with at least one internal axial cavity into which is inserted axially extending internal members whose neutral axes are offset from the neutral axis of the structure, with the internal members typically of a hollow cross section and externally coupled to the outer structure by a viscoelastic layer, such that when the outer structure vibrates, it shears with respect to the inner members and dissipates energy by shearing the viscoelastic coupling layer, and with temperature-controlled fluid pumped through hollow axial regions and along the structure.

Preferred operational methods, best mode embodiments, and other and further objects are hereafter explained and more particularly delineated in the appended claims.

DRAWINGS

The invention will now be described with reference to the accompanying drawing in which:

FIG. 1 is a cross section of a tubular beam with an outer tube and an inner tube and hollow circular segments located between the two tubes, where the segments are coupled to the tubes by a viscoelastic medium, and configured for temperature-controlled fluid to be circulated through the segments;

FIG. 2 is an isometric hollow rectangular beam structure with a bearing rail attached to it, and within which hollow axially aligned internal structural members are located and coupled to the outer structure by viscoelastic material, with bulkheads welded into the internal members to provide racking resistance, and to serve as caps which allow fluid supply lines to be attached so temperature-controlled fluid may be circulated within them;

Figure 7:
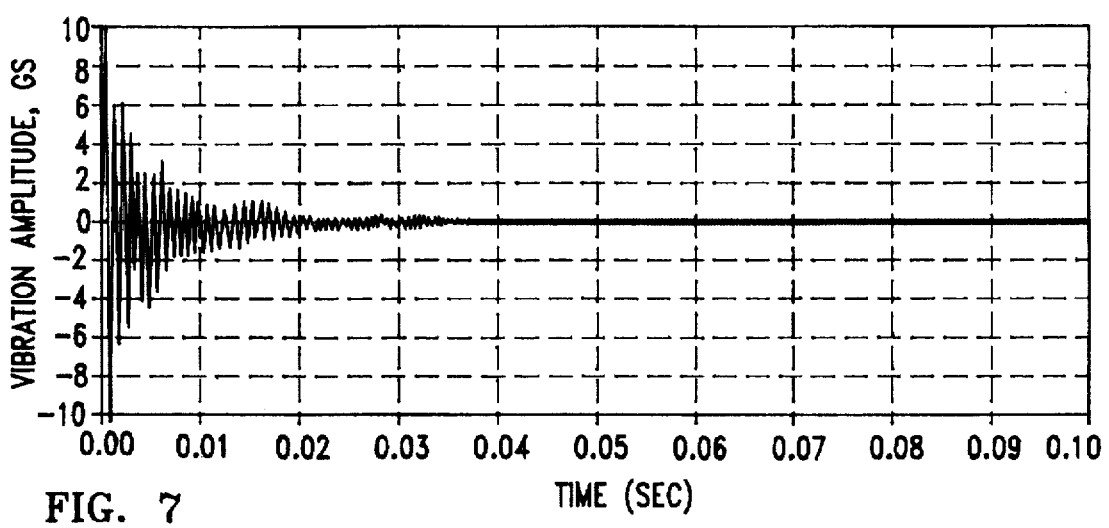
Figure 8:
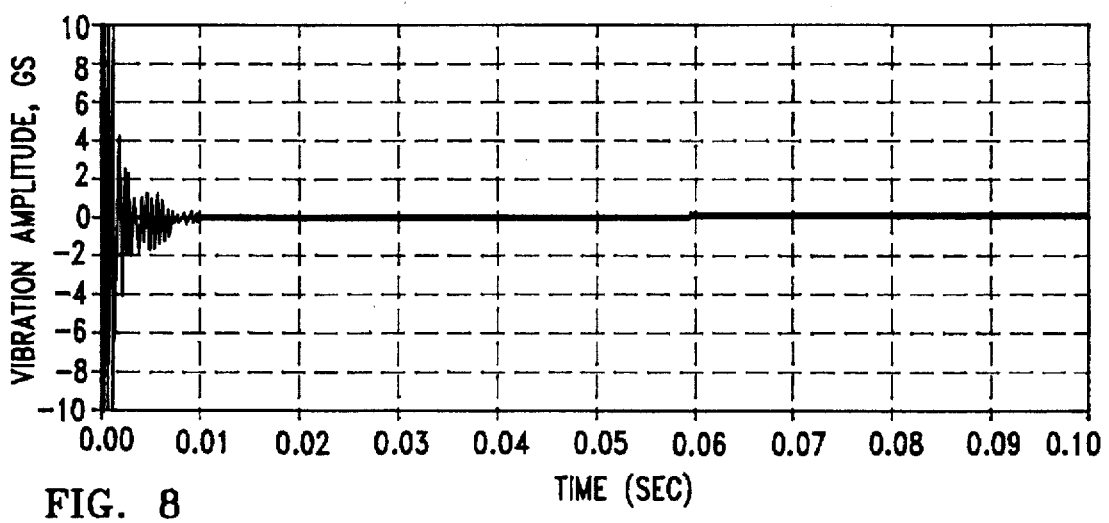

FIG. 7 is a plot of the impulse (vibration) response of a typical plain steel beam filled with concrete that shows the large amount of ringing still present in the beam; and FIG. 8 is a plot of the impulse (vibration) response of a typical plain steel beam filled with the specially designed internal damping members surrounded by carefully selected viscoelastic material that shows the lack of ringing in the beam, with the method of the invention.

THE INVENTION

The present invention unlike such prior art, is based upon the novel approach described in my copending U.S. patent application Ser. No. 942,262, filed Sep. 9, 1992. After the internal members are covered with a viscous lossy material layer and are inserted into the outer structure, a potting material, such as epoxy or rubber, may be poured around the members to take their shape and constrain the layer of lossy material. Additional damping may also be obtained by choosing the potting material to have lossy (damping) property as well. Particularly for smaller structures, or structures where the distance between the inner members and the outer structure can easily be controlled to a reasonable gap, typically on the order of a few millimeters, the coating of the inner members may be bypassed, and after the members are inserted into the outer structure they may be coupled in shear to the outer structure by pouring or injecting a viscoelastic material into the annulus between the members.

Figure 2:
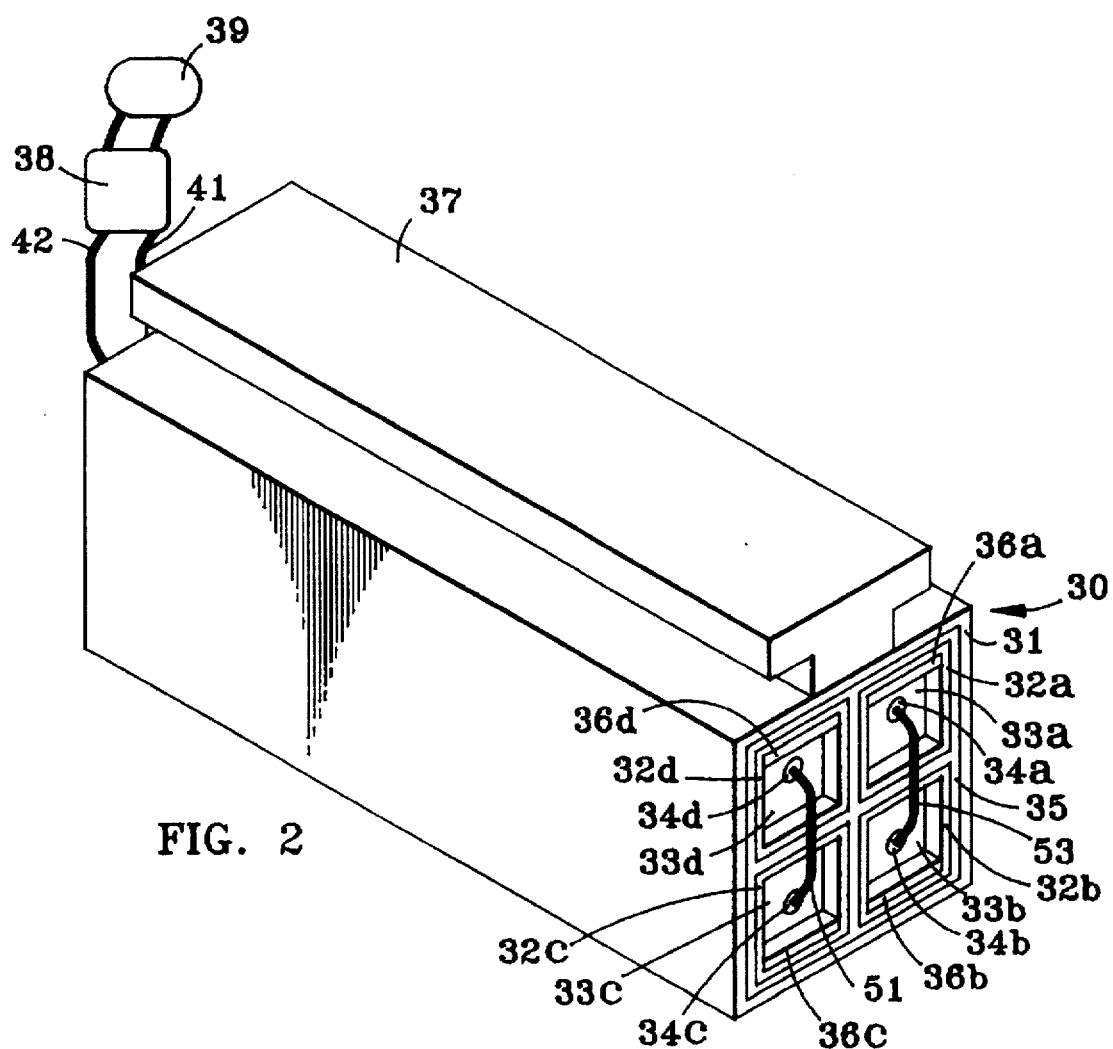
Figure 3:
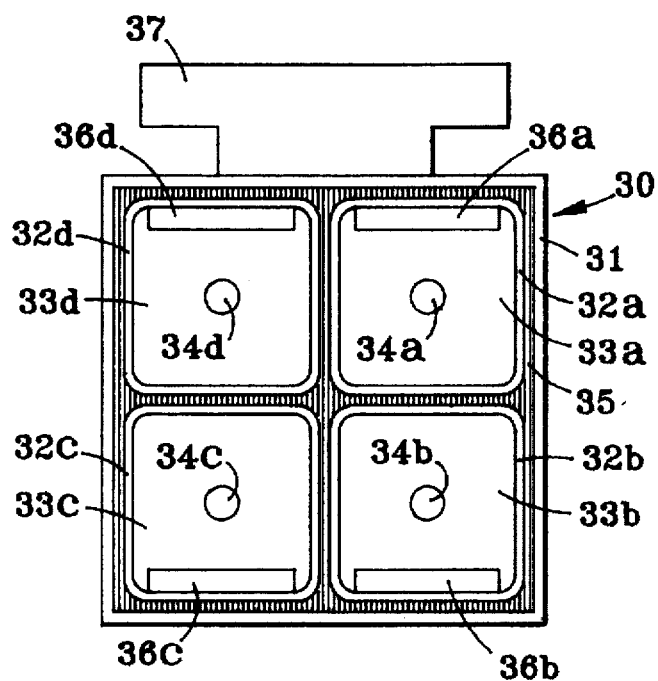
FIG. 3 is an end cross section view of the system of FIG. 2.

Turning first to the embodiment of FIGS. 2 and 3, showing one of the rectangular beam configurations of said copending application, the outer longitudinally axially extending structural beam support 31, originally hollow or poured with one or more axially extending openings therealong, contains four internally axially aligned rectangular tubular structurally support members 32a, 32b, 32c, and 32d, longitudinally extending together and along the length of the outer beam 31 and externally coupled to the inner wall of the outer surrounding beam and to one another by viscoelastic energy-absorbing thin layering 35. With the length-to-thickness ratio of such a structure, typically greater than three, and the internal structural members carefully sized so that their cross-sectional area is a substantial portion of the cross-sectional area of the outer surrounding structure 31, as shown and as explained in said copending application, the neutral axes of the members 32a–32d are located as far as possible away from that of the outer structure 31. This assures that any vibrational or other bending in the beam will result in maximum relative shear displacement between the outer and inner members, which in turn, shears the viscoelastic material and thereby dissipates vibration energy.

The internal damping tube members are covered with a viscoelastic material thin layer (of the order, from one to four millimeters in thinness) and inserted into the structure (e.g., wrapped in inexpensive self-adhesive sheet-type viscoelastic damping tape normally just placed by itself on the outside of a plate-type structure). A low-cost replicating material may then be poured around the tubes to couple them to each other and to the surrounding outer beam structure. With this unique arrangement of internal constrained layer dampers, a unique advantage is provided over previous external designs, in that no precision finishing or special surface preparation is required to prevent delamination. The internal design always forces intimate shearing contact between the structure and the stiff inner members via the viscoelastic damping material. Since the neutral axis of bending of the structure is significantly offset from the neutral axes of the internal members (e.g., the tubes), bending of the outer structure shears the viscoelastic material and dissipates energy.

In some instances where the gap between the internal members and the external structure can be controlled such that the guidelines for ratio of modulus over thickness can be met, one may be able to insert plain structural members into a structure, and then fill the gap between the members and the structure with the engineered viscoelastic damping material, and then cure it in place by heat or chemical means. Such is one aspect of the subject of the novel construction disclosed herein.

The beam 31, for illustrative purposes, is shown as part of the base 30 of a machine having a bearing rail 37, along which a linear motion system, not shown, would slide, as is well known.

As before explained, the invention involves synergistic use of the structure simultaneously to enable effective temperature control. A cooler 39 cools fluid, such as water or air, and a pump 38 pumps it into the system. The pumped fluid enters the damping tube member 32a, travels to the opposite end, where it is blocked by bulkhead 33a and then exits hole 34a, further traveling via tubing 53 to tube member 32b where it enters via hole 34b. The fluid then travels to the other end of the tube member where it is, in turn, piped into the end of tube member 32c, traveling to the end thereof and out of the hole 34c in endplate 33c. The fluid then flows up to tube member 32d and into hole 34d in endplate 33d and then back to the end of the tube where it is returned to the cooler 39. When loads are applied to the structure 30 and it bends, the radii of curvature of the inner tube members will be different because their neutral axes are displaced from one other. If desired, stiffening plates 36a, 36b, 36c, and 36d may be attached outside of the respective tubes 32a, 32b, 32c, and 32d in a manner where they are located as close to the outside of the tube structure as possible. This helps to shift the neutral axis and otherwise increase stiffness and damping, and also prevent distortion of the tube cross-section, but such are not always required.

Figure 1:
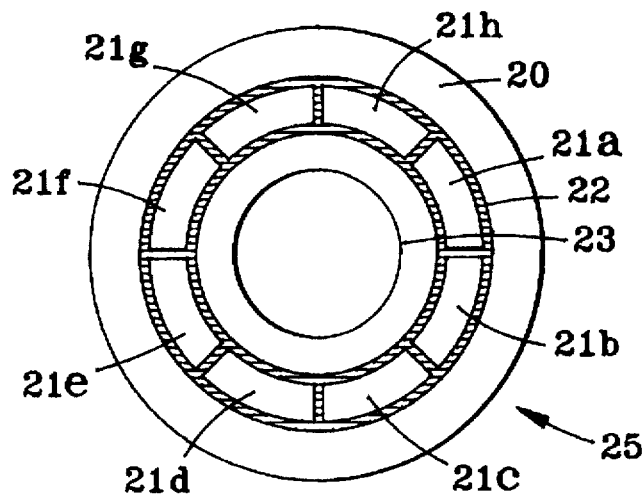

FIG. 1 illustrates the invention applied to a round structural element 25 comprised of an outer tube 20 and an inner tube or solid element 23 with longitudinally extending damping structural elements 21a–21h. The damping elements are coupled in bending shear to the tubular elements by a viscoelastic material 22; and in this version, the cooling fluid may be pumped through the center opening.

Figure 4:
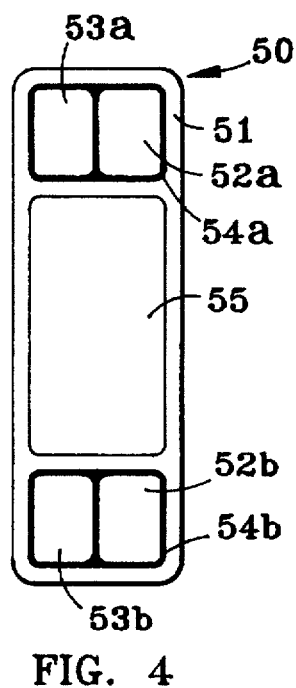
FIG. 4 is a cross section view through a beam structure with different hollow regions, the outermost regions being used for damping members, and the innermost region being used for temperature control.

FIG. 4 shows an end view of another modified beam system 50 which has three hollow cells in it. The center cell 55 is left open for minimizing weight while allowing the damping members to be placed far away from the neutral axis, and temperature control can then be attained by passing cooling media through the center cell 55, as in the embodiment of FIG. 1. The beam's structural element 51 is damped by having axial damping structural elements 52a and 53a in one hole that are coupled to the beam structure 51 by a viscoelastic material 54a; and for symmetry and maximum damping by having axial damping structural elements 52b and 53b in one hole that are coupled to the beam structure 51 by a viscoelastic material 54b.

Figure 5:
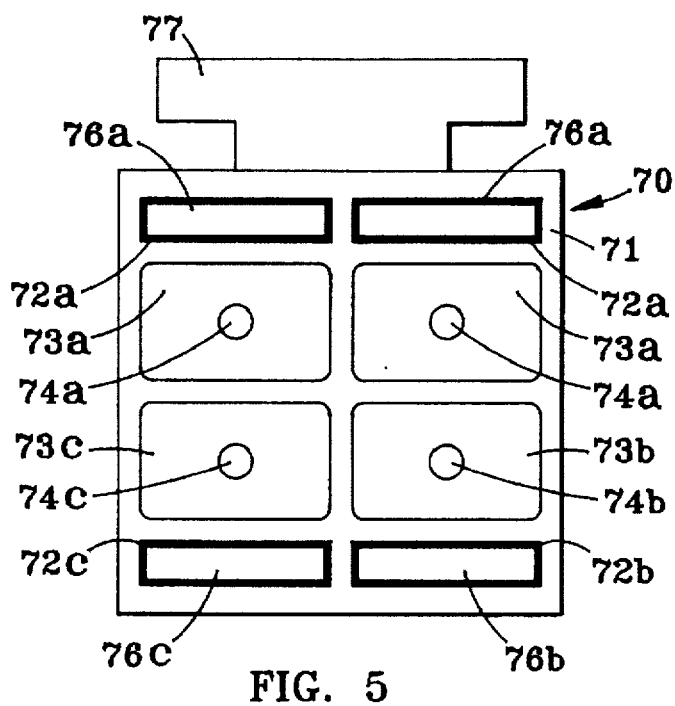
FIG. 5 is an end view of a structure similar to that of FIG. 1 in which the damping member has a solid cross section and the structure has hollow regions for temperature-controlled fluid to flow.

In some configurations, internal plates may be used for the damping members and hollow sections in the structure used as the cooling passages, as shown in FIG. 5. The machine base 70 has a bearing rail 77 attached to its upper surface. The base structure 71 has four internal damping members 76a, 76b, 76c, and 76d in upper and lower cavities. Viscoelastic material 72a, 72b, 72c, and 72d fill the cavities and viscoelastically couple damping members to the structure. Since the damping member neutral axes are far removed from the neutral axis of the structure 71, a large degree of damping will occur when the viscoelastic layer is selected according to the principles of the invention. The center of the structure has four axial cavities 73a, 73b, 73c, and 73d with end plates with holes 74a, 74b, 74c, and 74d, although for different types of structures, different numbers and shapes of holes are possible according to the type of structural and thermal performance desired. In these axial cavities 73a, 73b, 73c, and 73d, temperature-controlled fluid can readily be circulated. This design allows a machine to be sold as a simple machine with the option of adding high damping and/or cooling as a retrofit at a later date. Of course, these features can be purchased initially when the machine is sold.

The primary difference between the structures of FIG. 2 and FIG. 5 is that the structure 30 has the axial cavities filled with tubular damping members that also serve as passages for temperature-controlled fluid. The structure 70 of FIG. 5 separates the two functions; and thus, although it would be more costly in terms of structural design, it offers a greater degree of modularity.

Figure 6:
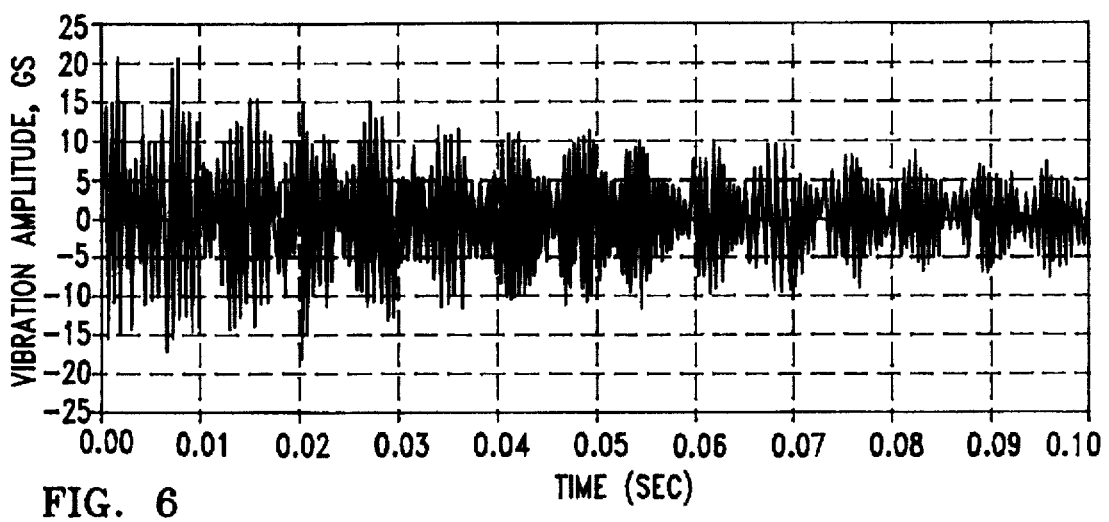
FIG. 6 is a plot of the impulse (vibration) response of a typical plain steel beam that shows the great mount of ringing in the beam.

The effectiveness of this method is illustrated in FIGS. 6, 7, and 8. FIG. 6 shows the response of a typical hollow steel beam that is struck by a hammer and the resulting vibration measured by an accelerometer. The beam vibrates for a very long time. FIG. 7 shows the vibration response of the same type of beam filled with concrete. If the beam were filled with epoxy granite or other types of prior art pour-in damping media, no better response would be obtained due to the lack of damping shear displacement integration over the length of the beam. FIG. 8, on the other hand, shows the dramatic damping that can be obtained when the outer structural beam encases substantial internal beams that are coupled in shear to the outer beam with a viscoelastic material in accordance with the invention. These inner beams, furthermore, may also serve as heat transfer devices to control the temperature of the beam.

This method underlying the invention, as before explained, is substantially different in principle and design methodology than, for example, merely placing prior art epoxy-coated rebar in concrete. For example, in a concrete section, the rebar must be strongly coupled to the concrete so the steel provides strength to the concrete. The steel carries most of the load and results in a substantial increase in static stiffness and strength. In the method described herein, the coupling between the inner and outer members is carefully regulated through the use of a viscoelastic layer, that by its very nature tends to creep; and thus only the optimal ratio of cross sectional areas are chosen to provide effective dynamic damping. No direct appreciable increase in strength and stiffness are directly sought; and the small increases that are obtained are of a secondary nature and are not significant.

In order to determine how much damping can be obtained, one should realize that there are such a large number of lossy materials available for compression type dampers, such as engine motor mounts which damp by squeezing a chunky pad, as opposed to the method here of shearing a very thin large area from the inside of a structure, that one can always select a material with the appropriate shear modulus G and loss factor $\eta$ to optimize damping given the gap h between the structure and the inner shear members. The true engineering effort goes into the sizing and placement of the inner members. The maximum theoretical damping that can be obtained can be predicted by the following equation that is condensed from the theory presented in said copending application Ser. No. 942,262:

$$\eta_{max} = \frac{\pi}{8} \left\{ \left\{ \frac{\Sigma I_i + y_i^2 A_i}{\Sigma I_i} - 1 \right\} \right\},$$

where $I_i$ are the moments of inertia of all the elements in the structure, including the inner shear members, about their own respective neutral axes. $y_i$ are the distances between the individual member's neutral axes and the structure's global neutral axis of bending. $A_i$ are the cross sectional areas of each of the components that make up the structure.

This formula represents the net effect of the inner structural member shearing a viscoelastic material along its length. It should be noted that the invention herein uses a shear displacement integrated along the length of internal members potted in place inside a structural member. This is in contrast to other dampers with internal structural members, such as motor mounts, that use a compression mode to damp lateral displacements. Physically, the subject invention described herein means that one end of the internal members is fixed to the outer structural member, and the other end is free to axially shear. As one moves along the inner member, each differential element sees its own incremental displacement, plus the effect of all previous differential members behind it. This cumulative effect on each damping element is what gives the invention described herein its amazing damping capabilities. When the cross sectional areas of the elements are selected according to the formula above, the viscoelastic material having properties in the following ranges results in a desirable high degree of damping:

$$\frac{\text{Young's Modulus}}{\text{Thickness}} = 25{,}000 \text{ psi/inch-to-}500{,}000 \text{ psi/inch}$$

Loss factor $\eta$ 1.0 @ 1 Hz to 0.1 @ 1000 Hz.

A hard material used alone to fill the structure, such as epoxy or cement, will not shear-damp because the loss factor is not high. A soft material such as tar or rubber will not shear-damp because it is too soft and the layer thickness required would be impractical to obtain in large structures.

It should be noted that in the embodiment of FIG. 2, the use of added plates 36, affixed (e.g., welded or bonded) to the sides of the tubes 32 that are furthest away from the neutral axis of the structure 31, enables cost saving by using thin wall tubes assisted with thick plates 36 affixed to the two sides of the tube that face the inside surface of the structure. Generally, the maximum damping factor one can obtain is an $\eta$ of $\frac{1}{3}$, which corresponds to an amplification at resonance of about Q=3; whereas an undamped steel structure itself may have a Q of 300 or more.

As an example of the beneficial effects of using a hollow tube internal shear damper system to also control the temperature in a precision machine, consider two cases: that of a steel machine bed that is filled with concrete to obtain increased stiffness and damping over a plain steel machine bed, and a steel machine bed with internal shear tubes. In both cases, assume that the cross sections are 1 m×1 m, and the beds are 4 m long. Such structures typically have thermal time constants on the order of hours, which coincides with the temperature cycles found in poorly air conditioned manufacturing plants in the summer time. In the morning it is cool, and towards the end of the day, it is hot.

There are two potential problems that occur. The first type of problem occurs when the machine uses temperature-controlled coolant to wash chips from the process. This results in the top of the machine being cooler than the rest of the machine. Depending on the temperature distribution, if the bottom pan of the machine tends to be warmer, then the machine bed will curve and the top will be concave. If the bottom of the machine is closely coupled to the ground, then the concrete slab of a shop may keep the bottom of the machine cool. If it is cooler than the top, then the machine bed will become convex. How delicate is the balance? First, it should be noted that thermal deformations have no respect for section thickness. Unlike deflections under load, increasing stiffness will not affect thermal growth. Increasing stiffness generally means increased mass which only changes the thermal time constant. Second, a simple calculation based on a linear gradient can give a good indication of thermal deformations, and different gradients can be superimposed upon each other to yield an approximation of the actual temperature profile and resulting deformation caused by thermal expansion. In actuality, for many machines with flood cooling that are operated in poorly air conditioned plants, a linear temperature gradient is a good approximation, and the gradients in concrete filled bases can easily run as high as 1–2 C°/m.

The equations for the effect of a temperature gradient on a beam's deflection can be represented and evaluated in a spreadsheet:

Enter numbers in bold

| Material properties | |
|---|---|
| Modulus of Elasticity: E | 3.11E+11 |
| Coefficient of thermal expansion: a | 1.08E−05 |
| Cross section properties | |
| flange thickness (0 for rect. beam): t | 0.025 |
| Height: h | 1 |
| Width:bo | 1 |
| Web thickness (bi=bo for rect. beam): bi | 0.05 |
| Moment of inertia: I | 0.0155 bo*h^3/12-(bo-bi)*(h-2*t)^3/12 |
| Loading characteristics | |
| Length of beam: L | 4 |
| Temp. gradient across beam: DT (degrees) | 1 |
| Results | |
| Radius of curvature | 92,593 1/(a*DT/h) |
| Thermal expansion bending moment | 51,836 E*I/B18 |
| Max. displacement error (micro units) | 21.60 1000000*L^2*a*DT/(8*h) |
| Max. slope error (µrad) | 21.60 1000000*L*a*DT/(2*h) |

The results indicate that even small gradients in large machines can create very large errors. In small machines, the errors are smaller; however, these machines are expected to hold better tolerances.

Various solutions such as actively varying the coolant temperature throughout the day and insulating the machine's exterior can help, but they require operator sophistication, and thus are not always as successful as would be desired.

The better alternative is provided by the present invention; namely, to circulate through the structure the same temperature-controlled fluid as is used to cool the cutting process. One cannot, however, merely have a hollow base that one runs water through like a giant aquarium, because gradients could still exist. To control the temperature of a structure most effectively, it should be designed like a heat exchanger with multiple passages to expose all surfaces of the structure to the flow of water in a recirculatory pattern. This effect is what is synergistically achieved through the use of the internal tubular shear damping mechanism disclosed herein.

When the internal damping members are tubes, as previously described, one obtains the added benefit for minimal manufacturing cost of being able to also use the tubes as heat exchanger tubes. Fluid goes in one end of a tube, out the other and into another tube. This zig-zag fluid flow pattern helps to ensure uniform temperature control in the machine. Adding exterior insulation can also be beneficial; but in general, the conductive and convective heat transfer coefficients between the structure and the air are far lower than the heat transfer coefficient across the viscoelastic material and the potting material layers. For the bed of the machine exposed to coolant and chips, an epoxy layer loaded with microspheres can also be an effective and tough thermal barrier.

How much flow through the tubes is required will depend on the size of the machine and the severity of the temperature disturbances, and whether or not the external surfaces of the machine are insulated. As a rule of thumb, it is a good idea to plan on recirculating the volume of fluid in the machine every five to ten minutes or so.

Ultimately when a machine must have good vibration control to make precise parts, it must also have good temperature control to also make precise parts. Individual systems for accomplishing these goals have been traditionally solved with external means. The combination of these elements into a single internal system in accordance with the invention, greatly increases machine performance. This is particularly true of machines that are kinematically mounted on three points, and thus in effect floating in space, and need good vibration and thermal isolation and control characteristics.

Further modifications will also occur to those skilled in the art; and such are considered to be within the spirit and scope of the invention as determined in the appended claims.

What is claimed is:

1. A method of damping longitudinally extending beam and related structures having internal axially extending opening(s), that comprises, inserting into and along such a beam, at least one longitudinally extending internal member of cross-sectional area a substantial portion of the cross-sectional area of the beam; coupling the internal member(s) to the beam surrounding the opening with a thin viscoelastic layer so that any vibrational bending of the beam results in relative shear displacement between the beam and the internal member(s) which shears the viscoelastic layer and thereby dissipates the vibration energy; and circulating temperature-controlled fluid along one of the member(s) and an opening along the beam, and in which each of the beam and the internal member(s) has a neutral bending axis, and the internal member(s) is sized and proportioned with its neutral axis as far as possible away from the beam neutral axis.

2. A method as claimed in claim 1 and in which the internal member(s) is tubular and the fluid is circulated therealong.

3. A method as claimed in claim 1 and in which the internal member(s) occupies only a region of the beam opening, and the fluid is circulated along this region thereof.

4. A method of damping longitudinally extending beam and related structures having internal axially extending opening(s), that comprises, inserting into and along such a bearer at least one longitudinally extending internal member of cross-sectional area a substantial portion of the cross-sectional area of the beam; coupling the internal member(s) to the beam surrounding the opening with a thin viscoelastic layer so that any vibrational bending of the beam results in relative shear displacement between the beam and the internal member(s) which shears the viscoelastic layer and thereby dissipates the vibration energy; and circulating temperature-controlled fluid along one of, the member(s) and an opening along the beam, and in which the internal member(s) is a solid member(s).

5. A method as claimed in claim 1 and in which the space between the internal member(s) and the beam opening is filled with a bonding agent and a thin viscoelastic energy damping material.

6. A beam-damping and temperature-controlling apparatus having, in combination with a longitudinally extending hollow or openings-provided beam, at least one longitudinally extending internal structural member inserted within and along the beam hollow substantially throughout the length of the beam and coupled to the beam by a viscoelastic layer for providing shear damping in response to vibrational bending of the beam, and means for circulating temperature-controlled fluid along and within the hollow of the beam and in which each of the beam and the internal structural member(s) has a neutral bending axis, and the internal structural member(s) is sized and proportioned with its neutral axis as far as possible away from the beam neutral axis.

7. Apparatus as claimed in claim 6 and in which one at least the member is tubular, and means is provided for circulating the fluid therethrough.

8. Apparatus as claimed in claim 7 and in which a plurality of successive tubular members is provided and also means is provided for providing zig-zag circulation of the fluid along the successive tubular members.

9. A beam-damping and temperature-controlling apparatus having in combination with a longitudinally extending hollow or openings provided beam, at least one longitudinally extending structural member inserted within and along the beam hollow substantially throughout the length of the beam and coupled to the beam by a viscoelastic layer for providing shear damping in response to vibrational bending of the beam, and means for circulating temperature-controlled fluid along and within the hollow of the beam, and in which the internal member(s) is disposed along one region of the beam hollow, and means is provided for circulating the fluid along another region thereof.

10. Apparatus as claimed in claim 6 and in which at least one of the internal member is solid.

11. Apparatus as claimed in claim 9 and in which the beam is of rectangular configuration, the said one region is along the inner walls of the beam hollow, and the said another region is the interior of the hollow.

12. Apparatus as claimed in claim 9 and in which the beam is of round configuration, the said one region is around the inner walls of the hollow and the said another region is central of the hollow.

13. An apparatus claimed as in claim 7 and in which axially oriented plates are laterally attached to the tubular members to increase effective damping while allowing tubular function for circulating fluid as heat exchange tubes.

* * * * *